United States Patent
Tanno et al.

(10) Patent No.: US 10,173,471 B2
(45) Date of Patent: Jan. 8, 2019

(54) PNEUMATIC TIRE WITH CYLINDRICAL METAL ANNULAR STRUCTURE AND METHOD OF MANUFACTURING SAME

(75) Inventors: Atsushi Tanno, Hiratsuka (JP); Noboru Takada, Hiratsuka (JP); Susumu Imamiya, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1113 days.

(21) Appl. No.: 14/125,898

(22) PCT Filed: Jun. 12, 2012

(86) PCT No.: PCT/JP2012/065033
§ 371 (c)(1),
(2), (4) Date: Dec. 12, 2013

(87) PCT Pub. No.: WO2012/173121
PCT Pub. Date: Dec. 20, 2012

(65) Prior Publication Data
US 2014/0110034 A1    Apr. 24, 2014

(30) Foreign Application Priority Data

Jun. 14, 2011 (JP) .................. 2011-132513

(51) Int. Cl.
*B60C 9/18* (2006.01)
*B60C 9/28* (2006.01)
(Continued)

(52) U.S. Cl.
CPC ............... *B60C 9/16* (2013.01); *B29D 30/06* (2013.01); *B29D 30/08* (2013.01); *B29D 30/70* (2013.01);
(Continued)

(58) Field of Classification Search
CPC ...... Y10T 152/10153; Y10T 152/10144; Y10T 152/10207; Y10T 152/10171;
(Continued)

(56) References Cited

U.S. PATENT DOCUMENTS 629,230 A * 7/1899 Beaven et al. .... Y10T 152/1020
152/200
713,351 A * 11/1902 Shepard ................... 152/193
(Continued)

FOREIGN PATENT DOCUMENTS

DE    10 2006 009 691    9/2007
DE    10 2012 204 110    11/2012
(Continued)

OTHER PUBLICATIONS

English machine translation of JP 2000-25412 A, Jan. 25, 2000.*
(Continued)

*Primary Examiner* — Adrienne C. Johnstone
(74) *Attorney, Agent, or Firm* — Thrope North & Western

(57) ABSTRACT

A pneumatic tire includes: an annular structure that is cylindrical and metal where at least an outer side surface in the radial direction is a rough surface; a tread rubber layer that will become a tread portion provided along a circumferential direction of the annular structure on an outer side of the annular structure; and a carcass portion including fibers covered with rubber, provided on at least both sides in a direction parallel to a center axis of the cylindrical structure including the annular structure and the tread rubber layer.

22 Claims, 10 Drawing Sheets

(51) Int. Cl.
*B29D 30/70* (2006.01)
*B60C 9/16* (2006.01)
*B29D 30/06* (2006.01)
*B29D 30/08* (2006.01)
*C09J 183/06* (2006.01)
*C23C 22/50* (2006.01)
*B29D 30/38* (2006.01)
*B60C 9/00* (2006.01)
*B60C 11/00* (2006.01)

(52) U.S. Cl.
CPC ............ *B60C 9/18* (2013.01); *B60C 9/28* (2013.01); *B29D 2030/383* (2013.01); *B60C 2009/0014* (2013.01); *B60C 2009/286* (2013.01); *B60C 2011/0025* (2013.01); *C09J 183/06* (2013.01); *C23C 22/50* (2013.01); *Y02T 10/862* (2013.01); *Y10T 152/10207* (2015.01); *Y10T 152/10765* (2015.01); *Y10T 152/10774* (2015.01); *Y10T 152/10855* (2015.01)

(58) Field of Classification Search
CPC ....... Y10T 152/1018; Y10T 152/10189; Y10T 152/10216; Y10T 152/10225; Y10T 152/10765; Y10T 152/10774; B60C 9/18; B60C 9/14; B60C 9/16; B60C 9/28; B60C 2009/286; B60C 2009/0014; B29D 30/70; B29D 30/38; B29D 30/40; B29D 2030/383; C23C 22/50; C09J 183/06
USPC ........ 152/192, 193, 196–198, 200–202, 526, 152/530, 538, 565; 156/153, 110.1, 123, 156/124, 316, 326, 314, 325; 216/35
See application file for complete search history.

(56) References Cited

U.S. PATENT DOCUMENTS

| | | | | |
|---|---|---|---|---|
| 840,503 A * | 1/1907 | Marks | ............... | Y10T 152/1020 |
| | | | | 152/200 |
| 1,428,726 A * | 9/1922 | Warth | ............ | 152/200 |
| 2,387,335 A * | 10/1945 | Leonard | ............ | 152/565 X |
| 2,987,095 A * | 6/1961 | Toulmin, Jr. | ............ | B60C 9/18 |
| 3,842,885 A * | 10/1974 | Alban | ............ | 152/200 |
| 4,011,899 A * | 3/1977 | Chamberlin | ............ | B60C 9/0007 |
| | | | | 152/565 X |
| 4,052,524 A * | 10/1977 | Harakas | ............ | 152/565 |
| 4,225,379 A * | 9/1980 | Ishii | ............ | 156/153 |
| 4,318,434 A * | 3/1982 | Markow | ............ | B60C 9/18 |
| | | | | 152/200 |
| 4,407,346 A * | 10/1983 | Bandel | | |
| 5,618,362 A * | 4/1997 | Janus | ............ | B60C 9/18 |
| | | | | 152/200 |
| 5,879,484 A * | 3/1999 | Spragg | ............ | B29D 30/70 |
| | | | | 152/526 |
| 5,958,161 A * | 9/1999 | Grimberg | ............ | 152/565 |
| 6,117,258 A * | 9/2000 | Spragg | ............ | B29D 30/70 |
| | | | | 152/526 |
| 6,260,593 B1 | 7/2001 | Spragg et al. | | |
| 8,474,499 B2 * | 7/2013 | Tuffile | | |
| 8,978,720 B2 * | 3/2015 | Kodama | ............ | B60C 9/18 |
| | | | | 152/200 X |
| 8,991,458 B2 * | 3/2015 | Tanno | ............ | B60C 9/18 |
| | | | | 152/526 |
| 9,156,314 B2 * | 10/2015 | Tanno | ............ | B60C 9/28 |
| 2003/0221760 A1 * | 12/2003 | Grimberg | ............ | 152/565 |
| 2005/0079364 A1 * | 4/2005 | van Ooij | ............ | C09J 183/08 |
| 2012/0160389 A1 * | 6/2012 | Tanno | ............ | B60C 9/18 |
| 2012/0299217 A1 | 11/2012 | Tanno et al. | | |
| 2015/0165820 A1 * | 6/2015 | Tanno | ............ | B60C 9/28 |

FOREIGN PATENT DOCUMENTS

| | | | | |
|---|---|---|---|---|
| JP | H08-269212 | | | 10/1996 |
| JP | 2000-025412 | | | 1/2000 |
| JP | 2000198312 | A | * | 7/2000 |
| JP | 2000-351852 | A | * | 12/2000 |
| JP | 2002002220 | A | * | 1/2002 |
| JP | 2002-087016 | | | 3/2002 |
| JP | 2002-160506 | | | 6/2002 |
| JP | 2004-042858 | | | 2/2004 |
| JP | 2005-035345 | | | 2/2005 |
| JP | 2005035317 | A | * | 2/2005 |

OTHER PUBLICATIONS

English machine translation of JP 2000-198312 A, Jul. 18, 2000.*
English machine translation of JP 2002-2220 A, Jan. 8, 2002.*
English machine translation of JP 2005-35317 A, Feb. 10, 2005.*
Akimasa DOI, "Recent Technical Trends in Tires", Journal of the Society of Rubber Industry, Sep. 1998, 24 pages, vol. 71, p. 588-594, Japan.
International Search Report dated Aug. 28, 2012, 4 pages, Japan.

* cited by examiner

US 10,173,471 B2

PNEUMATIC TIRE WITH CYLINDRICAL METAL ANNULAR STRUCTURE AND METHOD OF MANUFACTURING SAME

TECHNICAL FIELD

The present technology relates to a pneumatic tire.

BACKGROUND

Reducing the rolling resistance of a pneumatic tire is useful for improving the fuel consumption of a vehicle. Techniques exist for reducing the rolling resistance of a tire such as, for example, using a silica-compounded rubber for the tread.

While the technique for reducing the rolling resistance of pneumatic tires described in "Recent Technical Trends in Tires" (Akimasa DOI, Journal of the Society of Rubber Industry, September 1998, Vol. 71, p. 588-594) provides an improvement to the material, it is also possible to reduce the rolling resistance by modifying the structure of the pneumatic tire.

SUMMARY

The present technology provides a structure whereby the rolling resistance of a pneumatic tire is reduced and a method of manufacturing the structure whereby the rolling resistance of a pneumatic tire is reduced.

A pneumatic tire in accordance with an example of the present technology comprises an annular structure that is cylindrical and metal where at least an outer side surface in a radial direction is a rough surface. The pneumatic tire further comprises a tread rubber layer that will become a tread portion provided along a circumferential direction of the annular structure on an outer side of the annular structure. The pneumatic tire further comprises a carcass portion including fibers covered with rubber, provided on at least both sides in a direction parallel to a center axis of a cylindrical structure including the annular structure and the tread rubber layer.

With the pneumatic tire described above, the annular structure preferably has an inner side surface in the radial direction that is a rough surface.

Further, with the pneumatic tire described above, the outer side surface in the radial direction which is a rough surface preferably has an arithmetic mean roughness Ra of not less than 0.5 µm and not greater than 50 µm.

Further, with the pneumatic tire described above, the inner side surface in the radial direction which is a rough surface preferably has an arithmetic mean roughness Ra of not less than 0.5 µm and not greater than 50 µm.

Further, with the pneumatic tire described above, a JIS (Japanese Industrial Standards) hardness of the tread rubber layer is not less than 46 and not greater than 88, and the tread rubber layer preferably contacts the annular structure.

Further, the pneumatic tire described above preferably includes an adhesive rubber layer that bonds the tread rubber layer and the annular structure, and a JIS (Japanese Industrial Standards) hardness of the adhesive rubber layer is not less than 46 and not greater than 88.

Further, with the pneumatic tire described above, it is preferable that the annular structure is stainless steel, and the outer side surface in the radial direction that is a rough surface, or at least one surface of the outer side surface in the radial direction that is a rough surface and the inner side surface in the radial direction that is a rough surface has been subjected to roughening treatment that includes treatment to remove passivation film on the stainless steel.

Further, with the pneumatic tire described above, the annular structure is preferably a precipitation hardening stainless steel.

Further, with the pneumatic tire described above, the roughening treatment is preferably an acid treatment.

Further, with the pneumatic tire described above, the annular structure preferably has a plurality of through-holes.

The present technology provides a method for manufacturing a pneumatic tire comprising: an annular structure that is cylindrical and metal where at least an outer side surface in a radial direction is a rough surface; a tread rubber layer that will become a tread portion provided along a circumferential direction of the annular structure on an outer side of the annular structure; and a carcass portion including fibers covered with rubber, provided on at least both sides in a direction parallel to a center axis of the cylindrical structure including the annular structure and the tread rubber layer; wherein the method includes a procedure for obtaining the annular structure where at least the outer side surface in the radial direction has undergone roughening, a procedure for arranging an unvulcanized tread rubber layer on the outer side of the annular structure, and a procedure for vulcanizing the unvulcanized tread rubber layer and bonding the tread rubber layer and the annular structure.

BRIEF DESCRIPTION OF THE DRAWINGS

FIG. 2-1 is a perspective view of an annular structure included in the tire according to an embodiment.

FIG. 2-2 is a perspective view of a first modified example of the annular structure included in the tire according to an embodiment.

FIG. 2-3 is a perspective view of a second modified example of the annular structure included in the tire according to an embodiment.

FIG. 3 is an enlarged view of a carcass portion included in the tire according to an embodiment.

FIG. 6-1 is an explanatory drawing illustrating a step of a method for manufacturing an annular structure included in a tire according to an embodiment.

FIG. 6-2 is an explanatory drawing illustrating a step of a method for manufacturing an annular structure included in a tire according to an embodiment.

FIG. 6-3 is an explanatory drawing illustrating a step of a method for manufacturing an annular structure included in a tire according to an embodiment.

FIG. 6-4 is a cross-sectional view illustrating a thickness of a welded portion.

DETAILED DESCRIPTION

Figure 1:
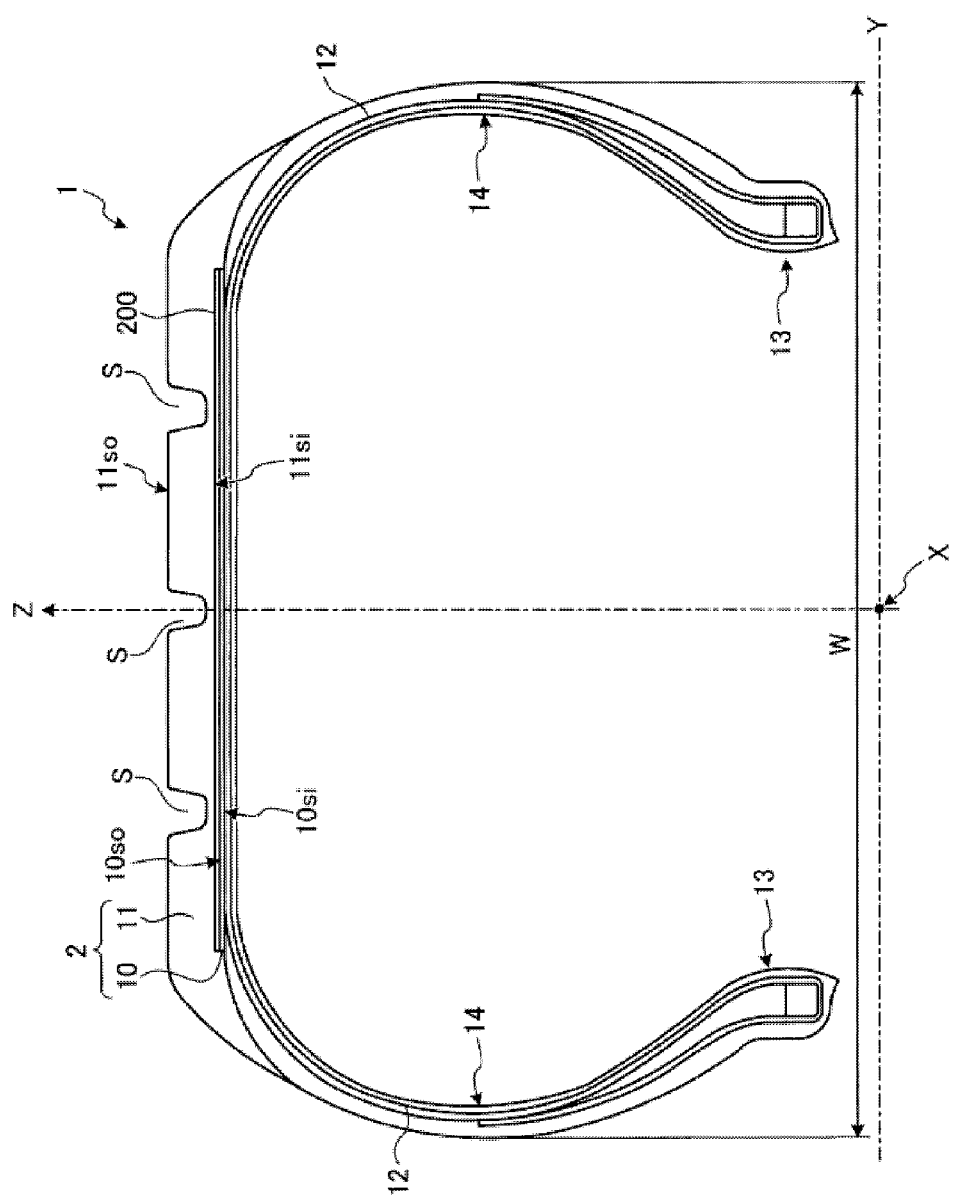
FIG. 1 is a meridian cross-sectional view of a tire according to an embodiment.

A form of the present technology (embodiment) is described below in detail while referring to the drawings.

However, the present technology is not limited to the descriptions given in the embodiment described below. The present technology includes the features described below, as well as variations and modifications to those features that could be easily conceived by a person skilled in the art, and also features that are essentially identical to those described herein. Furthermore, it is possible to combine the features described below in any desired manner.

When eccentric deformation is increased to a limit thereof in order to reduce the rolling resistance of a pneumatic tire (hereinafter referred to as "tire" as necessary), ground contact area between the tire and a road surface decreases and ground contact pressure increases. As a result, viscoelastic energy loss, caused by deformations of a tread portion, increases, leading to an increase in rolling resistance. The present technology reduces rolling resistance and enhances steering stability by ensuring the ground contact area between the tire and the road surface and maintaining eccentric deformation. Eccentric deformation is a single-dimensional mode of deformation in which a tread ring (crown region) of the tire shifts vertically while the round form of the tire is maintained. In order to ensure ground contact area between the tire and the road surface and maintain eccentric deformation, the tire according to an embodiment uses, for example, a structure including a cylindrical annular structure that is manufactured from a thin plate of a metal. A rubber layer is provided along a circumferential direction on an outer side of the annular structure. This rubber layer constitutes the tread portion of the tire.

Figures 1, 2:
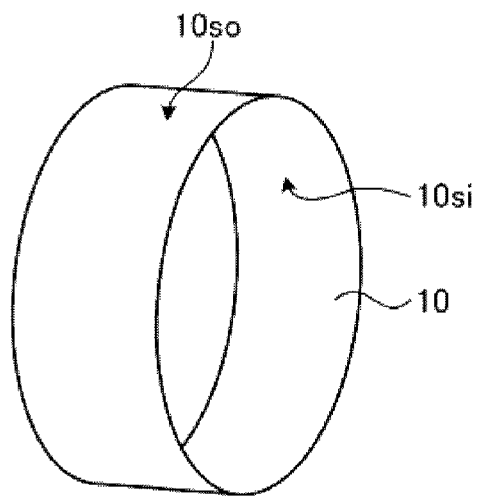
Figure 2:
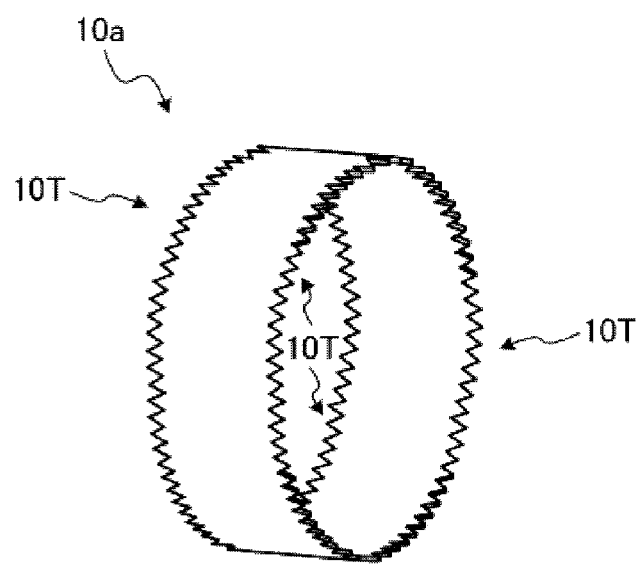
Figures 2, 3:
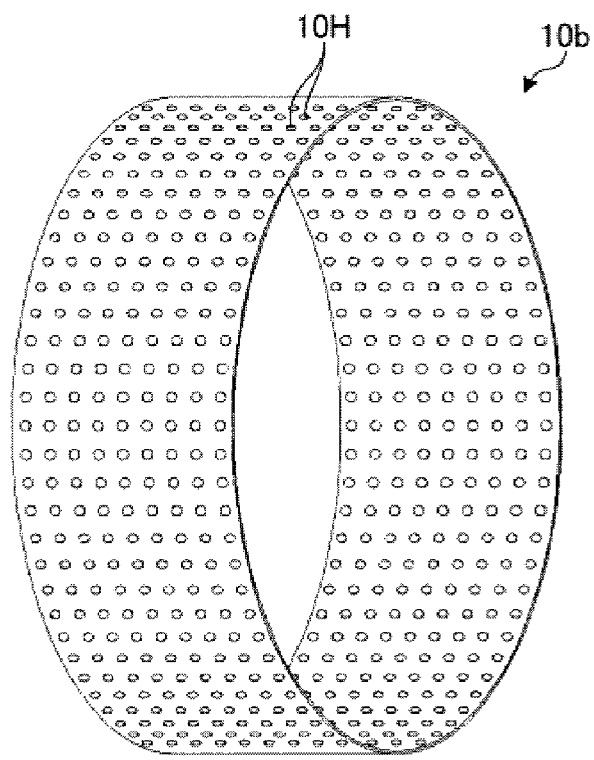
Figure 3:
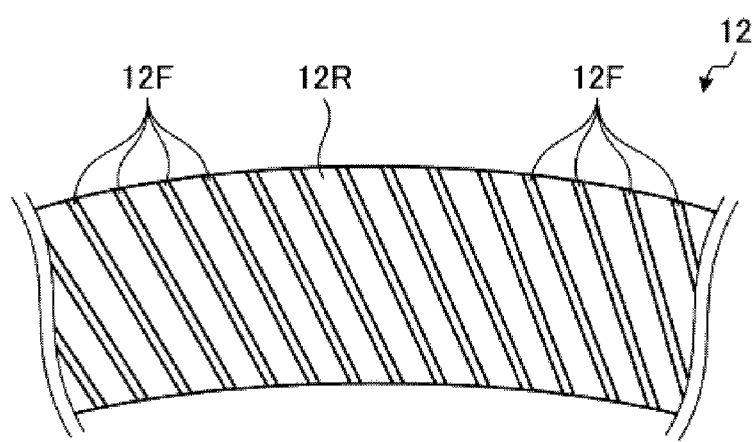

FIG. 1 is a meridian cross-sectional view of a tire according to the embodiment. FIG. 2-1 is a perspective view of an annular structure included in the tire according to the embodiment. FIG. 2-2 is a perspective view of a first modified example of the annular structure included in the tire according to the embodiment. FIG. 2-3 is a perspective view of a second modified example of the annular structure included in the tire according to the embodiment. FIG. 3 is an enlarged view of a carcass portion included in the tire according to the embodiment. A tire 1 is an annular structure. An axis that passes through a center of the annular structure is a center axis (Y-axis) of the tire 1. When in use, an interior of the tire 1 is filled with air.

The tire 1 rotates having the center axis (Y-axis) as a rotational axis. The Y-axis is the center axis and the rotational axis of the tire 1. An X-axis is an axis that is orthogonal to the Y-axis (the center axis (rotational axis) of the tire 1), and is parallel to a road surface with which the tire 1 makes ground contact. A Z-axis is an axis that is orthogonal to the Y-axis and the X-axis. A direction that is parallel to the Y-axis is a width direction of the tire 1. A direction that passes through the Y-axis and is orthogonal to the Y-axis is a radial direction of the tire 1. Additionally, a circumferential direction centered on the Y-axis is a circumferential direction of the pneumatic tire 1.

As illustrated in FIG. 1, the tire 1 includes a cylindrical annular structure 10, a tread rubber layer 11, an adhesive rubber layer 200, and a carcass portion 12. The annular structure 10 is a cylindrical member. The tread rubber layer 11 is provided along the circumferential direction of the annular structure 10 on an outer side 10so of the annular structure 10, and constitutes a tread portion of the tire 1. In this embodiment, the adhesive rubber layer 200 is provided between the tread rubber layer 11 and the annular structure 10 thereby adhering and bonding the tread rubber layer 11 and annular structure 10. Without the presence of the adhesive rubber layer 200, the tread rubber layer 11 and the annular structure 10 are in direct contact and mutually bonded. As illustrated in FIG. 3, the carcass portion 12 includes fibers 12F covered by rubber 12R. In this embodiment, as illustrated in FIG. 1, the carcass portion 12 is provided on an inner side in the radial direction of the annular structure 10 and connects both bead portions 13. In other words, the carcass portion 12 is continuous between both of the bead portions 13 and 13. Note that, while the carcass portion 12 is provided on both sides in the width direction of the annular structure 10, the carcass portion 12 need not be continuous between both of the bead portions 13 and 13. Thus, as illustrated in FIG. 1, it is sufficient that the carcass portion 12 be provided on both sides in the direction (the width direction) parallel to the center axis (Y-axis) of a cylindrical structure 2 including at least the annular structure 10 and the tread rubber layer 11.

In the tire 1, in a meridian cross-section of the structure 2, an outer side 11so (tread surface of the tire 1) of the tread rubber layer 11 and the outer side 10so of the annular structure 10 preferably have the same form, except at portions where a groove S is formed in the tread surface, and are parallel (including allowance and tolerance).

The annular structure 10 illustrated in FIG. 2-1 is a metal structure. In other words, the annular structure 10 is made from a metal material. The metal material used for the annular structure 10 preferably has a tensile strength of not less than 450 N/m$^2$ and not more than 2,500 N/m$^2$, more preferably not less than 600 N/m$^2$ and not more than 2,400 N/m$^2$, and even more preferably not less than 800 N/m$^2$ and not more than 2,300 N/m$^2$. When the tensile strength is within the range described above, sufficient strength and rigidity of the annular structure 10 can be ensured, and necessary toughness can be ensured. As a result, sufficient pressure resistance performance of the annular structure 10 can be ensured.

A pressure resistance parameter is defined as a product of the tensile strength (MPa) and the thickness (mm) of the annular structure 10. The pressure resistance parameter is a parameter by which resistance against internal pressure of the gas that the tire 1 is filled with is measured. The pressure resistance parameter is set to be not less than 200 and not greater than 1,700 and preferably not less than 250 and not greater than 1,600. When within this range, a maximum usage pressure of the tire 1 can be ensured, and safety can be sufficiently ensured. Additionally, when within the range described above, it is not necessary to increase the thickness of the annular structure 10, and it is also not necessary to use a material with a high breaking strength, which is preferable for mass production. Durability against repeated bending can be ensured for the annular structure 10 because it is not necessary to increase the thickness of the annular structure 10. Additionally, the annular structure 10 and the tire 1 can be manufactured at a low cost because it is not necessary to use a material with a high breaking strength. When used for a passenger car, the pressure resistance parameter is preferably not less than 200 and not greater than 1,000, and more preferably not less than 250 and not greater than 950. When used as a truck/bus tire (TB tire), the pressure resistance parameter is preferably not less than 500 and not greater than 1,700, and more preferably not less than 600 and not greater than 1,600.

It is preferable that the tensile strength of the metal material that can be used for the annular structure 10 be within the range described above. Preferably spring steel, high tensile steel, stainless steel, or titanium (including titanium alloy) is used for the metal material of the annular structure 10. Of these, stainless steel has high corrosion resistance and is not prone to oxidation degradation. Additionally, stainless steel is preferable because stainless steel with a tensile strength that is within the range described above is easily obtainable. It is possible to achieve both pressure resistance strength and durability against repeated bending by using stainless steel.

When manufacturing the annular structure 10 from stainless steel, it is preferable to use a JIS (Japanese Industrial Standards) G4303-classified martensitic stainless steel, ferritic stainless steel, austenitic stainless steel, austenitic-ferritic two-phase stainless steel, or precipitation hardening stainless steel. By using such a stainless steel, an annular structure 10 having superior tensile strength and toughness can be obtained. Additionally, of the stainless steels described above, precipitation hardening stainless steel (SUS630, SUS631, or SUS632J1) is preferable.

The outer side surface 10so in the radial direction of the annular structure 10 is a rough surface. Preferably, the arithmetic mean roughness Ra of the outer side surface 10so in the radial direction is not less than 0.5 μm and not greater than 50 μm, and more preferably is not less than 1 μm and not greater than 40 μm, and even more preferably is not less than 2 μm and not greater than 35 μm. Here, the arithmetic mean roughness Ra is defined according to JIS B0601 (1994) and is the mean of the absolute value of Z(x) in the reference length l. Here, Z(x) represents the height of a rough curved line in an arbitrary position x. Because the outer side surface 10so in the radial direction of the annular structure 10 is a rough surface, the adhesive rubber layer 200 that directly contacts the annular structure 10 in the recess of the rough surface digs therein such that the adhesive rubber layer 200 that digs into the recess of the rough surface becomes an anchor to firmly bond the annular structure 10 and the tread rubber layer 11. Therefore, this leads to an enhancement in the durability of the tire 1. When the arithmetic mean roughness Ra of the outer side surface 10so in the radial direction of the annular structure 10 is not less than 0.5 μm, the working effect of the adhesive rubber layer 200 as an anchor is even greater, and the annular structure 10 and the tread rubber layer 11 are bonded even more firmly. When the outer side surface 10so in the radial direction of the annular structure 10 is not greater than 50 μm, little work is required to treat the outer side surface 10so in the radial direction of the annular structure 10 to be a rough surface and it is simple and easy. Note that the tread rubber layer 11 may directly contact the annular structure 10 and, when doing so, the tread rubber layer 11 directly digs into the recess of the rough surface such that the annular structure 10 and the tread rubber layer 11 are firmly bonded. An adhesive may also be used when bonding the annular structure 10 and the tread rubber layer 11.

The rough surface may be formed by applying a roughening treatment to the outer side surface 10so of the annular structure 10. Examples of roughening treatment include sandblasting treatment or other mechanical treatments and acid treatment or other chemical treatments. As long as roughening is achieved, there is no limitation on the type of treatment, and differing treatments may be used together. Acid treatment, or other chemical treatments, are preferred in that there is no need to remove sand or other blasting media after treatment. Particularly when the annular structure 10 is made of stainless steel, chemical treatment is preferred for removing the passivation film that exists on the surface of the stainless steel. Treatment to remove the passivation film that exists on the surface of the stainless steel activates the surface of the stainless steel such that the annular structure 10 and the adhesive rubber layer 200 chemically interact to be bonded even more firmly. Examples of chemical treatments include a treatment using a mixture of sulfuric acid and oxalic acid, a treatment that uses a solution that contains phosphoric acid and ethyl alcohol, and the like. In addition to roughening treatments, other treatments may be performed to enhance the bonding of the surface of the annular structure 10 and the adhesive rubber layer 200. For example, when the annular structure 10 is made of stainless steel, after the passivation film that exists on the outer side surface 10so of the annular structure 10 is removed by a mixture of sulfuric acid and oxalic acid, a treatment may be performed for adhering a treatment solution of a silane coupling agent that contains an acid such as acetic acid. An example of a silane coupling agent includes bis(3-(triethoxysilyl)propyl) tetrasulfide. When applying a treatment to adhere a treatment solution of a silane coupling agent to the surface of the annular structure 10, it is preferred that a resorcin resin or a phenolic resin is blended with a compound that provides a methyl group such as hexamethoxy methylmelamine and the like in the rubber layer (the adhesive rubber layer 200 in this embodiment) that directly contacts the annular structure 10. By this, the rubber that directly contacts the annular structure 10 and the outer side surface 10so of the annular structure 10 are more firmly bonded via the resin.

The roughening treatment may be performed after the annular structure 10 is formed into a cylinder, or it may be performed before the annular structure 10 is formed into a cylinder. For example, when the annular structure 10 is formed from a plate like member to be described in detail hereinafter, the roughening treatment may be performed on the surface of the plate like member prior to becoming the outer side surface 10so of the annular structure 10, and then formed into a cylinder thereafter.

Firmly bonding the annular structure 10 and the tread rubber layer 11 using the adhesive rubber layer 200 enables a force to be transferred mutually between the annular structure 10 and the tread rubber layer 11. The adhesive rubber layer 200 preferably has a JIS hardness of not less than 46 and not greater than 88, more preferably of not less than 48 and not greater than 80, and even more preferably not less than 50 and not greater than 72. Here, the JIS hardness is defined as a type A durometer hardness measured at a temperature of 20° C. in accordance with JIS K6253. Because the adhesive rubber layer 200 has a JIS hardness of not less than 46 and not greater than 88, the adhesive rubber layer 200 that digs into the recess of the rough surface more effectively becomes an anchor thereby more firmly bond the annular structure 10 and the tread rubber layer 11. The adhesive rubber layer 200 preferably has a modulus at the time of 100% elongation of not less than 1.8 MPa and not more than 12 MPa, more preferably of not less than 2 MPa and not more than 9 MPa, and even more preferably of not less than 2.2 MPa and not more than 7 MPa. Since the adhesive rubber layer 200 is provided between the annular structure 10 and the tread rubber layer 11, the physical properties of the adhesive rubber layer 200 can be made appropriate by taking into account the adhesive properties between the adhesive rubber layer 200 and the annular structure 10, and the physical properties of the tread rubber layer 11 can be made appropriate by taking into account durability and/or traveling performance without considering the adhesive properties of the tread rubber layer 11 and the annular structure 10.

The adhesive rubber layer 200 preferably has a thickness of not less than 0.1 mm and not more than 2 mm. The tread rubber layer 11 preferably has a thickness of not less than 5 mm and not more than 15 mm.

In this embodiment, the adhesive rubber layer 200 is interposed between the tread rubber layer 11 and the annular structure 10, but the tread rubber layer 11 may be made to directly contact the annular structure 10 to bond the tread rubber layer 11 and the annular structure 10. In this case, the tread rubber layer 11 digs into the recess of the rough surface of the outer side surface 10so in the radial direction of the annular structure 10, and the tread rubber layer 11 that digs into the recess of the rough surface becomes an anchor to firmly bond the annular structure 10 and the tread rubber layer 11. The tread rubber layer 11, when bonding to the annular structure 10 by direct contact, preferably has a JIS hardness of not less than 46 and not greater than 88, more preferably has a JIS hardness of not less than 48 and not greater than 80, and even more preferably has a JIS hardness of not less than 50 and not greater than 72. Because the tread rubber layer 11 has a JIS hardness of not less than 46 and not greater than 88, the tread rubber layer 11 that digs into the recess of the rough surface more effectively becomes an anchor thereby more firmly bond the annular structure 10 and the tread rubber layer 11. When the tread rubber layer 11 directly contacts the annular structure 10, the tread rubber layer 11 preferably has a modulus at the time of 100% elongation of not less than 1.8 MPa and not more than 12 MPa, more preferably of not less than 2 MPa and not more than 9 MPa, and even more preferably of not less than 2.2 MPa and not more than 7 MPa.

As with an annular structure 10a illustrated in FIG. 2-2, recesses and protrusions 10T having a serrated blade form may be provided on both sides in the width direction of the annular structure 10a. The tread rubber layer 11 illustrated in FIG. 1 is attached to the outer side in the radial direction of the annular structure 10a, and the recesses and protrusions 10T function to strengthen the bonding between the annular structure 10a and the tread rubber layer 11. Therefore, providing the annular structure 10a with the recesses and protrusions 10T is preferable because the annular structure 10a and the tread rubber layer 11 will be more reliably affixed and durability will be enhanced.

Additionally, the annular structure 10 preferably is not exposed to the outer side in the radial direction of the tread rubber layer 11. Such a configuration will lead to the annular structure 10 and the tread rubber layer 11 being more reliably affixed. Furthermore, the annular structure 10 may be embedded in the tread rubber layer 11. In such a case as well, the annular structure 10 and the tread rubber layer 11 can be more reliably bonded.

As in the annular structure 10b illustrated in FIG. 2-3, the annular structure 10b may have a plurality of through-holes 10H that penetrate an inner circumferential surface and an outer periphery thereof. The tread rubber layer 11 is attached, via the adhesive rubber layer 200, to the outer side in the radial direction and/or the inner side in the radial direction of the annular structure 10b. The adhesive rubber layer 200 is attached to the annular structure 10b via physical bonding or chemical bonding with the annular structure 10b. Further, the adhesive rubber layer 200 is chemically bonded to the tread rubber layer 11. The through-holes 10H provide an effect of strengthening the physical bond between the annular structure 10b and the adhesive rubber layer 200. Therefore, bonding strength with the annular structure 10 is increased by chemical and physical effects (anchoring effects) and, as a result, the tread rubber layer 11 is reliably affixed to the annular structure 10 via the adhesive rubber layer 200. This leads to an enhancement in the durability of the tire 1. Note that, when the annular structure 10b and the tread rubber layer 11 are in direct contact without the adhesive rubber layer 200 therebetween, the annular structure 10b and the tread rubber layer 11 are directly bonded by chemical and physical effects.

A cross-sectional area of one of the through-holes 10H is preferably not less than 0.1 mm$^2$ and not more than 100 mm$^2$, more preferably not less than 0.12 mm$^2$ and not more than 80 mm$^2$, and even more preferably not less than 0.15 mm$^2$ and not more than 70 mm$^2$. When within this range, unevennesses in the carcass portion 12 are suppressed, and bonding by adhesion, specifically, chemical bonding can be sufficiently used. Furthermore, when within the range described above, the physical effect described above, specifically the anchoring effect, is most effective. Due to these effects, the bond between the annular structure 10 and the tread rubber layer 11 can be strengthened.

The form of the through-holes 10H is not limited, but a circular or elliptical form is preferable (the form is circular in this embodiment). Additionally, an equivalent diameter $4 \times A/C$ of the through-holes 10H (where C is a circumferential length of the through-holes 10H, and A is the opening area of the through-holes 4H) is preferably not less than 0.5 mm and not more than 10 mm. The through-holes 10H more preferably have a circular form and a diameter of not less than 1.0 mm and not more than 8.0 mm. When within this range, physical and chemical bonding can be used effectively and, therefore, the bond between the annular structure 10b and the tread rubber layer 11 will be stronger. As described hereinafter, the equivalent diameter or diameter of all of the through-holes 10H need not be the same.

A sum of the area of the through-holes 10H is preferably not less than 0.5% and not more than 30%, more preferably not less than 1.0% and not more than 20%, and even more preferably not less than 1.5% and not more than 15% of a surface area of the outer side in the radial direction of the annular structure 10. When within this range, strength of the annular structure 10b can be ensured while physical and chemical bonding are used effectively. As a result, the bond between the annular structure 10b and the tread rubber layer 11 will be stronger and necessary rigidity of the annular structure 10b can be ensured. Spacing of the through-holes 10H may be equal or unequal. By using such a configuration, the footprint of the tire 1 can be controlled.

The annular structure 10b can be manufactured by abutting short sides of a rectangular plate material in which the plurality of through-holes 10H have been punched, and then welding. Thus, the annular structure 10b can be manufactured in a comparatively simple manner. Note that the method for manufacturing the annular structure 10b is not limited to this and, for example, the annular structure 10b may be manufactured by forming a plurality of holes in the outer peripheral portion of a cylinder and, thereafter, milling an interior of the cylinder.

The tread rubber layer 11 includes a rubber material including a synthetic rubber, a natural rubber, or a mixture thereof; and carbon, $SiO_2$ or the like, which is added to the rubber material as a reinforcing material. The tread rubber layer 11 is an endless belt-like structure. The tread rubber layer 11 may also have a tread pattern formed from a plurality of grooves in the outer side 11so.

The carcass portion 12 is a strengthening member that, together with the annular structure 10, fulfills a role as a pressure vessel when the tire 1 is filled with air. The carcass portion 12 and the annular structure 10 support the load that acts on the tire 1 due to the internal pressure of the air that fills the interior of the tire 1, and withstand dynamic loads received by the tire 1 during traveling. The carcass portion 12 contacts the inner side surface 10si in the radial direction of the annular structure 10 such that the annular structure 10 and the carcass portion 12 bond. In this embodiment, an inner liner 14 is provided on an inner side of the carcass portion 12 of the tire 1. The inner liner 14 suppresses the air filling the interior of the tire 1 from leaking. Each end of the carcass portion 12 has a bead portion 13 on the inner side thereof in the radial direction. The bead portions 13 mate with a rim of a wheel on which the tire 1 is attached.

In this embodiment, the inner side surface 10si in the radial direction of the annular structure 10 is also a rough surface. Preferably, the inner side surface 10si in the radial direction has an arithmetic mean roughness Ra of not less than 0.5 μm and not greater than 50 μm, and more preferably is not less than 1 μm and not greater than 40 μm, and even more preferably is not less than 2 μm and not greater than 35 μm. Because the inner side surface 10si in the radial direction of the annular structure 10 is a rough surface, the carcass portion 12 digs into the recess of the rough surface such that the carcass portion 12 that digs into the recess of the rough surface becomes an anchor to firmly bond the annular structure 10 and the carcass portion 12. Therefore, the durability of the tire 1 is further enhanced compared to when only the outer side surface 10so in the radial direction of the annular structure 10 is a rough surface. When the arithmetic mean roughness Ra of the inner side surface 10si in the radial direction of the annular structure 10 is not less than 0.5 μm, the working effect of the carcass portion 12 as an anchor is even greater, and the annular structure 10 and the carcass portion 12 are bonded even more firmly. When the inner side surface 10si in the radial direction of the annular structure 10 is not greater than 50 μm, little work is required to treat the inner side surface 10si in the radial direction of the annular structure 10 to be a rough surface and it is simple and easy.

Any of the various treatments described above for roughening the outer side surface 10so in the radial direction of the annular structure 10 can be applied as the treatment for roughening the inner side surface 10si in the radial direction of the annular structure 10. The roughening treatment may be performed after the annular structure 10 is formed into a cylinder, or it may be performed before the annular structure 10 is formed into a cylinder. For example, when the annular structure 10 is formed from a plate like member to be described in detail hereinafter, the roughening treatment may be performed on the surface of the plate like member prior to becoming the inner side surface 10si of the annular structure 10, and then formed into a cylinder thereafter. The method for roughening the outer side surface 10so in the radial direction of the annular structure 10 may differ from the method for roughening the inner side surface 10si in the radial direction of the annular structure 10. Further, the outer side surface 10so in the radial direction of the annular structure 10 and the inner side surface 10si in the radial direction of the annular structure 10 may undergo roughening at the same time, or the roughening may be performed at different times.

Figure 4:
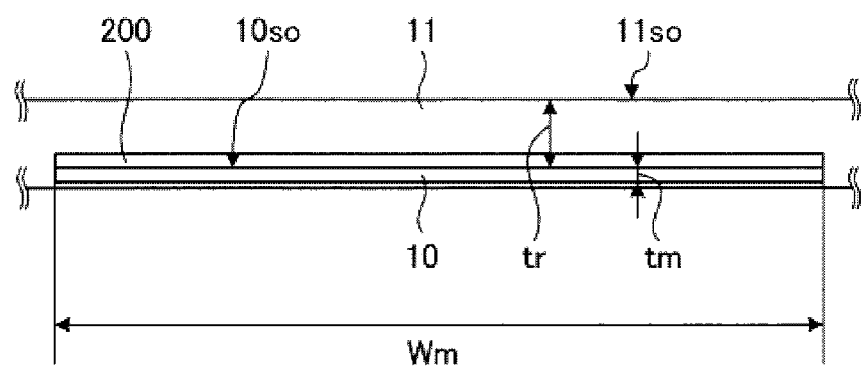
FIG. 4 is a meridian cross-sectional view of the annular structure and a rubber layer.

FIG. 4 is a meridian cross-sectional view of the annular structure and a tread rubber layer. An elastic modulus of the annular structure 10 is preferably not less than 70 GPa and not more than 250 GPa, and more preferably not less than 80 GPa and not more than 230 GPa. Additionally, a thickness tm of the annular structure 10 is preferably not less than 0.1 mm and not more than 0.8 mm. When within this range, durability against repeated bending can be ensured while ensuring pressure resistance performance. A product of the elastic modulus and the thickness tm of the annular structure 10 (referred to as the "rigidity parameter") is preferably not less than 10 and not greater than 500, and more preferably not less than 15 and not greater than 400.

By configuring the rigidity parameter to be within the range described above, rigidity of the annular structure 10 in the meridian cross-section increases. As a result, when the tire 1 is filled with air and when the tire 1 makes ground contact with a road surface, deformations caused by the annular structure 10 in the meridian cross-section of the tread rubber layer 11 (tread portion) are suppressed. Therefore, viscoelastic energy loss of the tire 1 caused by the deformations is suppressed. Additionally, by configuring the rigidity parameter to be within the range described above, rigidity of the annular structure 10 in the radial direction decreases. As a result, the tread portion of the tire 1 pliably deforms at a ground contact portion between the tire 1 and the road surface, just as with conventional pneumatic tires. Due to such a function, the tire 1 eccentrically deforms while localized concentrations of strain and stress in the ground contact portion are avoided and, therefore, strain in the ground contact portion can be dispersed. Therefore, localized deformation of the tread rubber layer 11 in the ground contact portion is suppressed, resulting in ground contact area of the tire 1 being ensured and rolling resistance being reduced.

Furthermore, with the tire 1, because the in-plane rigidity of the annular structure 10 is great and the ground contact area of the tread rubber layer 11 is ensured, ground contact length in the circumferential direction can be ensured. Therefore, lateral forces, generated when a rudder angle is input, increase. As a result, the tire 1 can obtain high cornering power. Additionally, when the annular structure 10 is manufactured from a metal, most of the air that the interior of the tire 1 is filled with will not pass through the annular structure 10. This is beneficial as it simplifies managing the air pressure of the tire 1. Therefore, declines in the air pressure of the tire 1 can be suppressed even when usage of the tire 1 is such that the tire 1 is not filled with air for an extended period of time.

A distance tr between the outer side 10so of the annular structure 10 and the outer side 11so of the tread rubber layer 11 is preferably not less than 3 mm and not more than 20 mm. By configuring the distance tr to be within such a range, excessive deformation of the tread rubber layer 11 when cornering can be suppressed while ensuring riding comfort. The direction parallel to the center axis (Y-axis) of the annular structure 10 or, in other words, a dimension Wm (annular structure width) in the width direction of the annular structure 10 is preferably not less than 50% (W×0.5) and not more than 95% (W×0.95) of the total width W (in a state where the tire 1 is assembled on a wheel having a rim width stipulated in JATMA and inflated with air to 300 kPa) in the direction parallel to the center axis (Y-axis) of the tire 1 illustrated in FIG. 1. If Wm is less than W×0.5, rigidity in the meridian cross-section of the annular structure 10 will be insufficient, resulting in a reduction of the region that maintains eccentric deformation with respect to the tire width. As a result, the effect of reducing rolling resistance may decline and cornering power may decrease. Moreover, if Wm exceeds W×0.95, the tread portion may cause buckling deformation in the center axis (Y-axis) direction of the annular structure 10 when making ground contact, and this may lead to the deformation of the annular structure 10. By configuring Wm so that W×0.5≤Wm≤W×0.95, cornering power can be maintained while rolling resistance is reduced and, furthermore, deformation of the annular structure 10 can be suppressed.

With the tire 1, in the meridian cross-section illustrated in FIG. 1, the outer side 11so of the tread rubber layer 11 or, in other words, the profile of the tread surface, preferably has the same form as the outer side 10so of the annular structure 10, except at portions where the groove S is formed. As a result of such a configuration, when the tire 1 makes ground contact or is rolling, the tread rubber layer 11 (tread portion) and the annular structure 10 deform in substantially the same manner. Therefore, deformation of the tread rubber layer 11 of the tire 1 is reduced, and this leads to a reduction in viscoelastic energy loss and a further reduction in rolling resistance.

If the outer side 11so of the tread rubber layer 11 and the outer side 10so of the annular structure 10 protrude facing outward in the radial direction of the tire 1 or, alternately protrude facing inward in the radial direction of the tire 1, pressure distribution in the ground contact portion of the tire 1 will become uneven. As a result, localized concentrations of strain and stress may be generated in the ground contact portion, and localized deformation of the tread rubber layer 11 may occur in the ground contact portion. In this embodiment, in tire 1, as illustrated in FIG. 1, the outer side 11so of the tread rubber layer 11 (the tread surface of the tire 1) and the outer side 10so of the annular structure 10 have the same form (preferably parallel) and, furthermore, preferably are parallel (including allowance and tolerance) to the center axis (Y-axis) of the tread rubber layer 11 and the annular structure 10 (i.e. the structure 2). Due to such a structure, the ground contact portion of the tire 1 can be configured to be substantially flat. With the tire 1, pressure distribution in the ground contact portion is uniform and, therefore, localized concentration of strain and stress in the ground contact portion is suppressed and localized deformation of the tread rubber layer 11 in the ground contact portion is suppressed. As a result, viscoelastic energy loss is reduced and, therefore, rolling resistance of the tire 1 is also reduced. Additionally, with the tire, localized deformation of the tread rubber layer 11 in the ground contact portion is suppressed and, therefore, the ground contact area can be ensured and, simultaneously, the ground contact length in the tire circumferential direction can be ensured. Therefore, with the tire 1, cornering power can also be ensured.

In this embodiment, the form of the tread rubber layer 11 in the meridian cross-section is preferably provided so that the outer side 11so of the tread rubber layer 11 and the outer side 10so of the annular structure 10 are parallel to the center axis (Y-axis). For example, the form of the tread rubber layer 11 in the meridian cross-section may be a trapezoidal shape or a parallelogram shape. When the form of the tread rubber layer 11 in the meridian cross-section is trapezoidal, an upper bottom or a lower bottom of the trapezoid may be the outer side 11so of the tread rubber layer 11. Preferably in either case, the annular structure 10 is parallel to the profile of the tread surface of the tire 1 (except the portions where the groove is formed). Next, a method for manufacturing the annular structure will be described.

Figure 5:
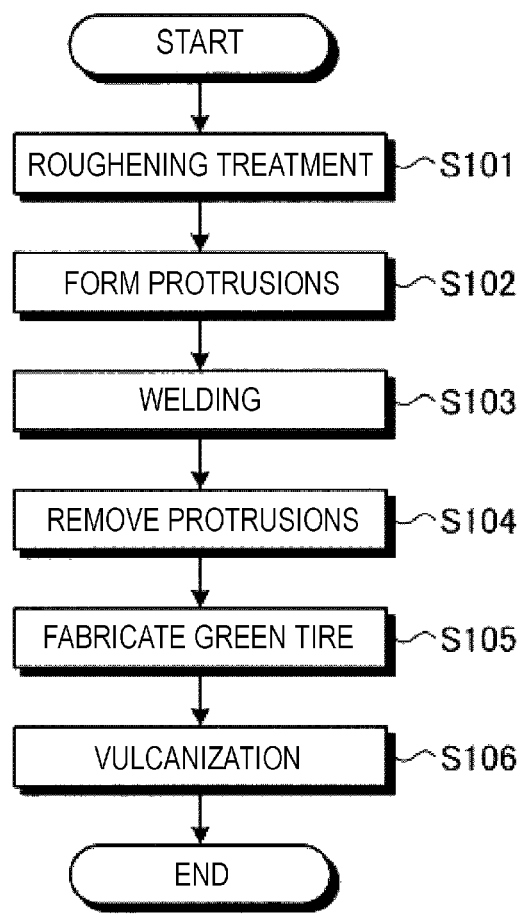
FIG. 5 is a flowchart showing steps of a method for manufacturing a tire according to an embodiment.
Figures 1, 6:
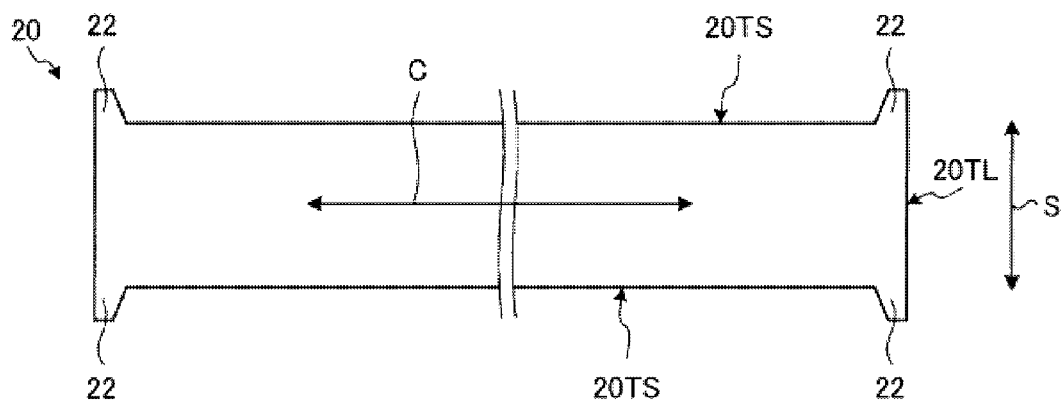
Figures 2, 6:
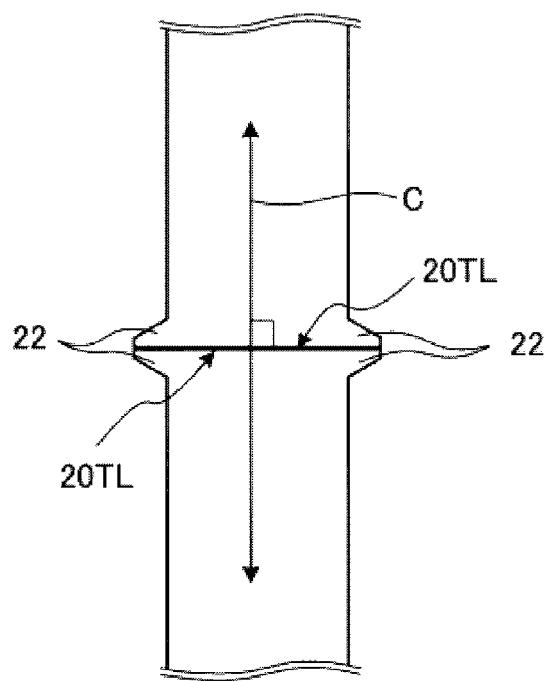
Figures 3, 6:
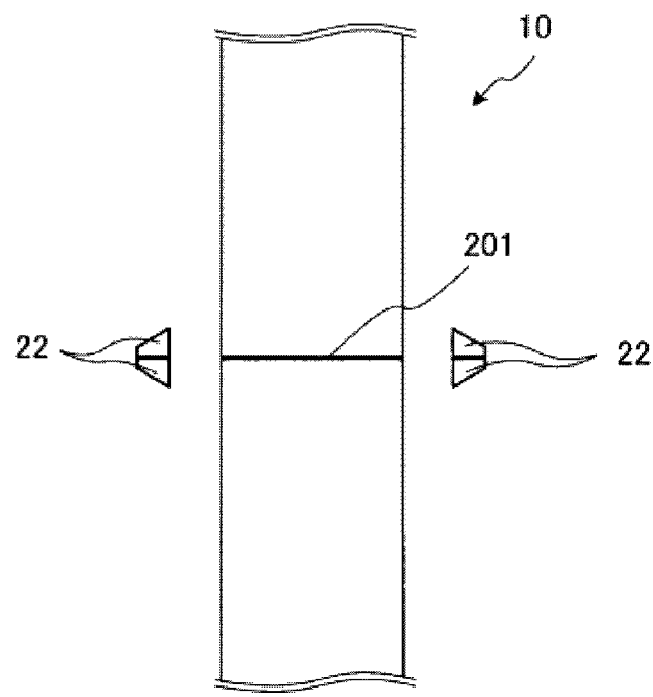
Figures 4, 6:
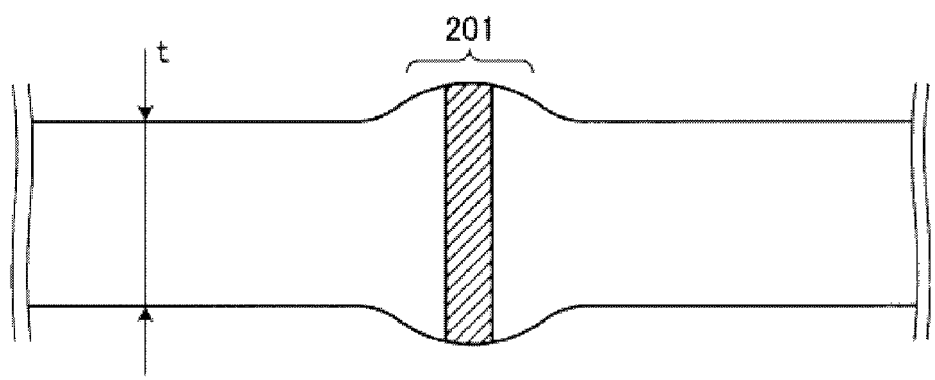

FIG. 5 is a flowchart showing steps of a method for manufacturing the tire according to the embodiment. FIGS. 6-1 to 6-3 are explanatory drawings illustrating steps of the method for manufacturing the annular structure included in the tire according to the embodiment. FIG. 6-4 is a cross-sectional view illustrating a thickness of a welded portion. When manufacturing the annular structure 10, a roughening treatment is performed on both sides of the large metal plate member (step S101). Any of the methods described above may be used as the roughening treatment; however, the method is not limited to that described above. Next, as illustrated in FIG. 6-1, a plate material 20 having a rectangular form when viewed planarly, and having protrusions 22 that protrude outward in a direction parallel to a lateral direction is formed on sides of both edges 21TL and 21TL in the longitudinal direction (the direction indicated by arrow "C" in FIG. 6-1) on both edges 21TS and 21TS in the lateral direction (the direction indicated by arrow "S" in FIG. 6-1) (step S102, FIG. 6-1). The plate material 20 can be obtained by, for example, cutting a large metal plate member.

Next, both edges 20TL and 20TL of the plate material 20 in the longitudinal direction are abutted and bonded by welding (step S103, FIG. 6-2). The edges 20TL and 20TL in the longitudinal direction preferably are orthogonal to the longitudinal direction of the plate material 20 (the direction indicated by arrow "C" in FIG. 6-2). With such a configuration, if repeated bending occurs in the welded portion as a result of repeated deformation of the annular structure 10 in the radial direction, declines in the durability of the annular structure 10 can be suppressed because the length of the welded portion where the repeated bending is occurring can be shortened. As a result, when using the annular structure 10 in the tire 1, declines in durability can be suppressed.

Types of welding that can be used include gas welding (oxyacetylene welding), arc welding, TIG (Tungsten Inert Gas) welding, plasma welding, MIG (Metal Inert Gas) welding, electro-slag welding, electron beam welding, laser beam welding, ultrasonic welding, and the like. Thus, the annular structure 10 can be easily manufactured by welding both edges of the plate material. Note that following welding, the plate material 20 may be subjected to heat-treating and/or drawing. As a result, the strength of the manufactured annular structure 10 can be increased. For example, when using precipitation hardening stainless steel, an example of the heat-treating is one in which the plate material 20 is heated at 500° C. for 60 minutes. The conditions of the heat-treating are not limited to this though, and can be modified as necessary based on the characteristics sought.

Next, after welding, the protrusions 22 are removed and the annular structure 10 illustrated in FIG. 2-2 is obtained (step S104, FIG. 6-3). Heat-treating and the like of the annular structure 10 is preferably conducted after the protrusions 22 are cut off. Because the strength of the annular structure 10 will be increased as a result of the heat-treating or the like, the protrusions 22 can be easily cut off by cutting off the protrusions 21 prior to conducting heat-treating or the like. After obtaining the annular structure 10, the unvulcanized tread rubber layer is disposed on the outer side of the annular structure 10. The unvulcanized adhesive rubber layer is arranged between the annular structure 10 and the unvulcanized tread rubber layer. The unvulcanized adhesive rubber layer may not be arranged for a tire in which the tread rubber layer 11 directly contact the outer surface 10so in the radial direction of the annular structure 10. Further, the carcass portion 12 is attached to the annular structure 10 and the bead portions 13 are provided on the carcass portion 12. Thus a green tire is fabricated (step S105). Thereafter, the green tire is vulcanized (step S106), the tread rubber layer 11 and the annular structure 10 are bonded with the adhesive rubber layer 200 therebetween to thereby complete the tire 1 illustrated in FIG. 1. Note that the method for manufacturing the annular structure 10 is not limited to the example described above. The annular structure 10 may be manufactured by cutting a cylinder or, alternately, the annular structure 10 may be manufactured via extrusion molding. The roughening treatment of the annular structure 10 may be performed after the annular structure 10 is formed into a cylinder, or it may be performed before the annular structure 10 is formed into a cylinder.

The annular structure 10 has a welded portion 201 as illustrated in FIG. 6-3. As illustrated in FIG. 6-4, the welded portion 201 may have a thickness that is greater than a thickness of surroundings thereof. A thickness t at a region of the welded portion 201, except at the welded portion 201 itself, is not less than 0.1 mm and not more than 0.8 mm, and is preferably not less than 0.15 mm and not more than 0.7 mm. Additionally, the thickness of the portion of the welded portion 201 that is greater than the thickness of the surroundings thereof is not more than 1.3 times, and preferably not more than 1.2 times the thickness of said surroundings. When within this range, durability against repeated bending can be ensured while ensuring pressure resistance performance. The region "except at the welded portion 201 itself" refers to the thickness of the plate material 20 prior to welding and, in the annular structure 10, refers to the regions other than the welded portion 201 that have a uniform thickness. Next, in the fabrication of the green tire, a more specific description will be given below of procedures for vulcanizing the green tire (step S105 and step S106).

Figure 7:
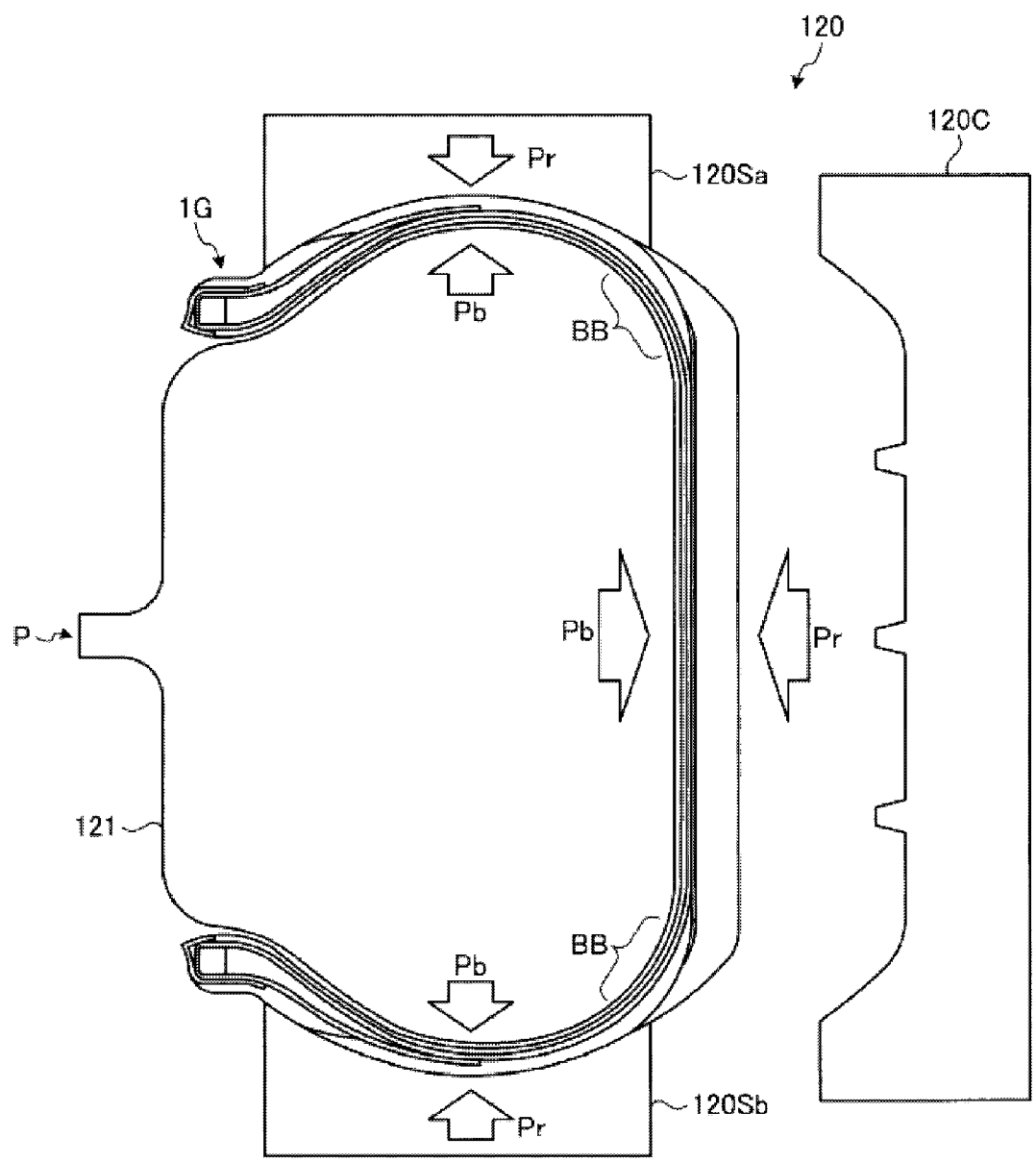
FIG. 7 is a drawing illustrating an example of manufacturing a tire according to an embodiment using a conventional vulcanization mold.
Figure 8:
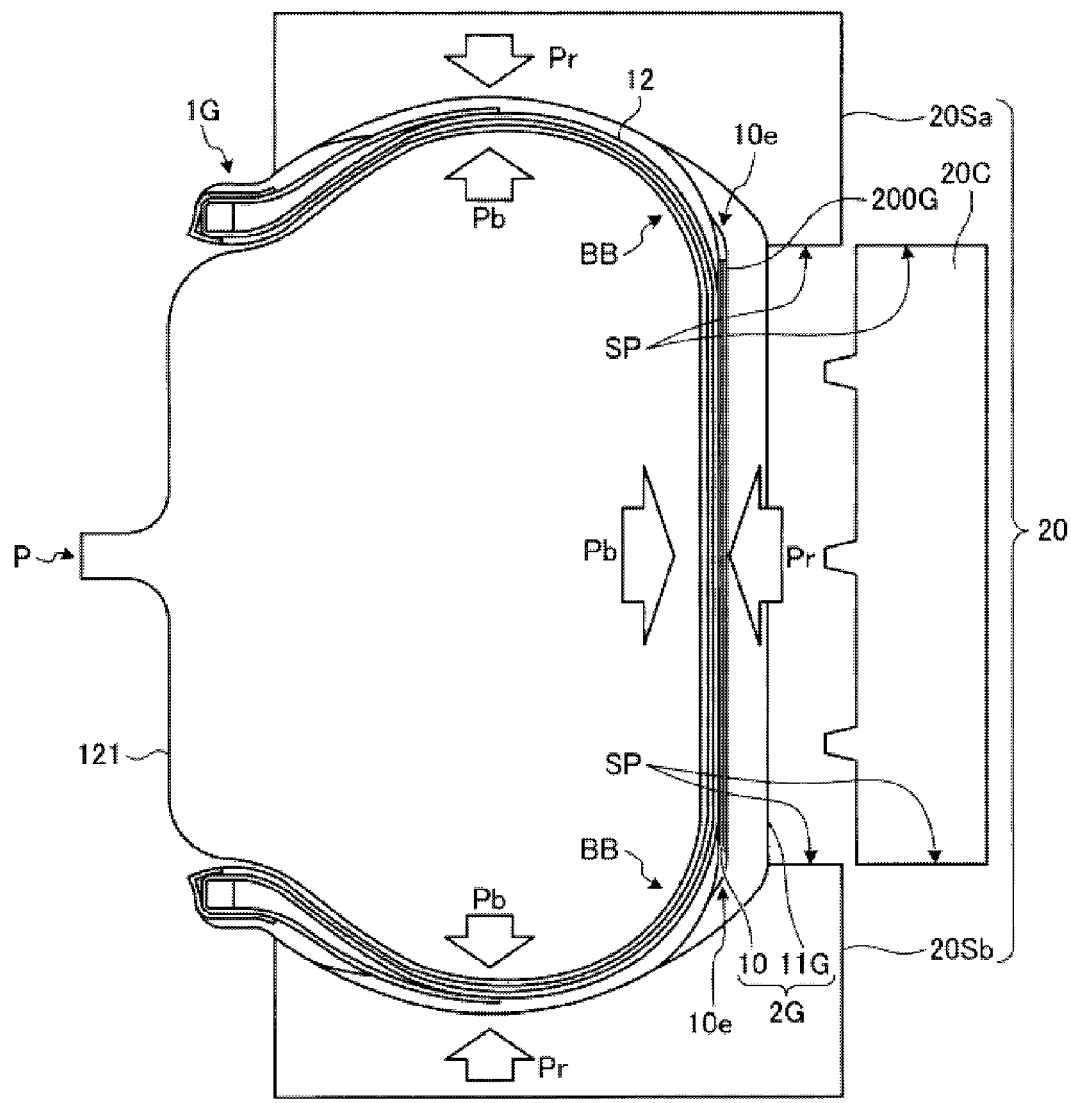
FIG. 8 is a drawing illustrating an example of manufacturing a tire according to an embodiment using a vulcanization mold according to the embodiment.

FIG. 7 is a drawing illustrating an example of manufacturing a tire according to the embodiment and the modified example thereof, using a conventional vulcanization mold. FIG. 8 is a drawing illustrating an example of manufacturing a tire according to the embodiment and the modified example thereof, using a vulcanization mold according to the embodiment. To date, with tires where angled steel wires arranged in parallel and covered by rubber are laminated, the tire itself expands a certain percentage due to a vulcanization bladder expanding and contacting the tire from the tire inner side during vulcanization, thereby pressing the tire against an outer side vulcanization mold. Therefore, vulcanization is carried out via the actions of pressure and heat. However, the annular structure 10 included in the tire 1 according to the embodiment has extremely high elastic modulus in the tensile (expanding) direction and, therefore, the amount of expansion of the tire itself due to the pressure of the bladder is small. Therefore, in contrast with tires heretofore where green tires are molded using a short circumferential length with respect to the dimensions of the vulcanization mold, with the tires according to the embodiment, a green tire 1G is molded having greater dimensions (dimensions close to the dimensions of the vulcanization mold).

When manufacturing the tire 1 that uses the thin-plate cylindrical annular structure 10, as illustrated in FIG. 7, a green tire 1G having dimensions (outer circumferential length) greater than those of conventional tires is molded and vulcanized because lift does not act on the annular structure 10. When using a conventional vulcanization mold 120 as illustrated in FIG. 7, there has been a possibility of the annular structure 10 buckling in the radial direction when a sector 120C is closed after side plates 120Sa and 120Sb are closed. That is, when the sector 120C closes after the green tire 1G is placed in the vulcanization mold 120, a portion of the sector 120C that forms the grooves (i.e. the protrusions) contacts the tread portion of the green tire 1G and, in this state, applies more pressure than needed to the inner side of the tread portion. This is because the rubber flow cannot keep up and, as a result, there is a possibility that the annular structure 10 may buckle in the radial direction.

As a countermeasure, there is a method in which a bladder 121 is pressurized before the sector 120C closes, but in this case, pressure is applied to the green tire 1G prior to vulcanization. With the tire 1 according to this embodiment, the side plates 120Sa and 120Sb are closed and, therefore, a counter force Pr with respect to a pressure Pb of the bladder 121 is generated. Additionally, because the annular structure 10 is a cylinder with a high elastic modulus, the counter force Pr is generated by the circumferential direction tensile rigidity thereof. However, the green tire 1G in an unvulcanized state cannot withstand the pressure Pb, and blowouts may occur because the counter force Pr cannot be obtained in a buttress portion BB of the green tire 1G.

Therefore, with the method for manufacturing a pneumatic tire according to the embodiment, as illustrated in FIG. 8, using a vulcanization mold 20 in which a split position of a sector 20C and side plates 20Sa and 20Sb is changed to an appropriate position, a bladder 21 is pressurized before the sector 20C closes. For example, after the side plates 20Sa and 20Sb are closed and prior to the sector 20C closing, the pressure of the bladder 21 is raised 0.2 MPa to 2.0 MPa and preferably 0.3 MPa to 1.0 MPa. As a result, buckling of the annular structure 10 and blowouts from the buttress portion BB of the green tire 1G when vulcanizing can be avoided.

The vulcanization mold 20 has a sector 20C, and side plates 20Sa and 20Sb, each disposed vertically. The sector 20C is split into multiple portions in the circumferential direction. The side plates 20Sa and 20Sb are continuous doughnut-like disks. A split position SP of the sector 20C and the side plates 20Sa and 20Sb is a position on an inner side in the width direction of the annular structure 10 included in the green tire 1G. As a result, when the green tire 1G is subjected to pressure from a bladder 21, the counter force Pr can be obtained from the side plates 20Sa and 20Sb even in the buttress portion BB and, therefore, blowouts can be avoided.

The split position SP between the sector 20C and the side plates 20Sa and 20Sb is preferably a position not less than 70% and not more than 100%, and more preferably not less than 80% and not more than 99.5% of an annular structure width Wm from the end portion 10e on the outer side in the width direction of the annular structure 10. As a result, the counter force Pr from the side plates 20Sa and 20Sb can be reliably obtained and, therefore, blowouts caused by the pressure Pb of the bladder 21 can be reliably avoided.

With the method for manufacturing a pneumatic tire according to this embodiment, first, a green tire 1G of a pneumatic tire, including a cylindrical annular structure 10, an unvulcanized tread rubber layer 11G, which will become a tread portion, provided along a circumferential direction of the annular structure 10 on an outer side of the annular structure 10, an unvulcanized adhesive rubber layer 200G arranged between the unvulcanized tread rubber layer 11G and the annular structure 10, and a carcass portion 12 including fibers covered with rubber, provided on at least both sides in the width direction of a cylindrical structure 2G including the annular structure 10 and the unvulcanized tread rubber layer 11G, is disposed in a vulcanization mold 20. Note that, when manufacturing the tire without the adhesive rubber layer 200 where the annular structure 10 and the tread rubber layer 11 directly contact, the green tire in which the unvulcanized tread rubber layer 11G is disposed directly on the outer side of the annular structure 10 may be disposed on the inside of the vulcanization mold 20. The vulcanization mold 20 is split into the side plates 20Sa and 20Sb and the sector 20C at a position on the inner side in the width direction of the annular structure.

The annular structure 10 preferably is not exposed from the outer side in the radial direction of the unvulcanized tread rubber layer 11G. Such a configuration will lead to more reliable bonding being possible, via vulcanization, between the annular structure 10 and the unvulcanized tread rubber layer 11G and more reliable bonding between the annular structure 10 and the tread rubber layer 11 of the tire 1. Furthermore, the annular structure 10 may be embedded in the unvulcanized tread rubber layer 11G. In such a case as well, the annular structure 10 and the tread rubber layer 11 can be more reliably bonded.

Next, the bladder 21 inside the green tire 1G is pressurized after closing the side plates 20Sa and 20Sb and prior to closing the sector 20C. Then the sector 20C is closed and vulcanization is started. As a result, with the method for manufacturing a pneumatic tire according to this embodiment, buckling of the annular structure 10 and blowouts from the buttress portion BB of the green tire 1G when vulcanizing can be avoided. Thus, with the method for manufacturing a pneumatic tire according to this embodiment, tire 1 can be manufactured whereby rolling resistance is reduced.

Next, the bond between the surface of the annular structure and the adhesive rubber layer is strengthened by roughening the surface of the annular structure. A test sample was prepared by adhering the rubber layer to a segment of the precipitation hardening stainless steel for use as a model of the annular structure. The test sample was prepared according to JIS K6256-2 (2006). The preparation methods of the test samples are shown below.

[Test Sample 1]

The following compound rubbers were vulcanized onto precipitation hardening stainless steel plates (arithmetic mean roughness Ra=0.1 μm) for which surface roughening was not performed.

| | |
|---|---|
| natural rubber | 100 parts by mass |
| carbon black | 60 parts by mass |
| zinc oxide | 5 parts by mass |
| antiaging agent | 1 parts by mass |
| sulfur | 6 parts by mass |
| accelerator | 1 parts by mass |
| phenolic resin | 3 parts by mass |
| hexamethoxy methylmelamine | 3 parts by mass |

Vulcanizing time was 30 min. at 150° C.

[Test Sample 2]

Roughening treatment was performed using a sandblast method on the surface of a precipitation hardening stainless steel plate. The arithmetic mean roughness Ra after roughening treatment was 2 μm. Vulcanization was performed on the compound rubbers used in the fabrication of Test Sample 1 on the obtained steel plate in a similar manner to that of Test Sample 1.

[Test Sample 3]

Roughening treatment was performed using the following method on the surface of a precipitation hardening stainless steel plate. The passivation film on the steel plate surface was removed by immersing the steel plate in a mixture of sulfuric acid and oxalic acid. The arithmetic mean roughness Ra after removing was 5 μm. Subsequently, the steel plate was immersed in a bis(3-(triethoxysilyl)propyl) tetrasulfide solution containing acetic acid. Next, vulcanization was performed on the compound rubbers used in the fabrication of Test Sample 1 on the steel plate surface in a similar manner to that of Test Sample 1.

A peel test was performed on the rubber layers of the test samples 1 to 3 obtained above, and the adhesive strength between the test sample and the rubber layer was evaluated.

The peel test was performed according to JIS K6256-2 (2006). Evaluation results are shown below.

TABLE 1

| | Test Sample 1 (Without roughening treatment) | Test Sample 2 (Blast treatment) | Test Sample 3 (Acid treatment) |
|---|---|---|---|
| Arithmetic mean roughness (Ra) | 0.1 μm | 2 μm | 5 μm |
| Adhesive strength (index) | 100 | 134 | 265 |

It is evident from Table 1 that, compared to Test Sample 1, the bond between the steel plate and the rubber layer was stronger in Test Samples 2 and 3 which were prepared by undergoing roughening treatment and which used a steel plate having an arithmetic mean roughness Ra of not less than 0.5 μm and not greater than 50 μm. Furthermore, it is evident that Test Sample 3 in which roughening treatment was performed by a treatment for removing the passivation film of the precipitation hardening stainless steel plate had a stronger bond between the steel plate and the rubber layer than Test Sample 2 in which roughening treatment was performed using sandblasting.

From the above results, it is evident that making the surface of an annular structure to be a rough surface provides a firmer bond between the surface of the annular structure that has a rough surface and the rubber surface that is in direct contact with the surface of the annular structure that has a rough surface compared to a surface of the annular structure that is not made into a rough surface. Therefore, according to this embodiment, it is evident that a pneumatic tire including: an annular structure that is cylindrical and metal where at least an outer side surface in the radial direction is a rough surface; a tread rubber layer that will become a tread portion provided along a circumferential direction of the annular structure on an outer side of the annular structure; and a carcass portion including fibers covered with rubber, provided on at least both sides in a direction parallel to a center axis of the cylindrical structure including the annular structure and the tread rubber layer, has superior durability. Further, it is evident that the annular structure is preferably stainless steel and particularly precipitation hardening stainless steel. Furthermore, it is evident that the roughening treatment is preferably a treatment that includes a treatment for removing the passivation film on the stainless steel and particularly an acid treatment, and is more preferably performed using a solution of sulfuric acid and oxalic acid.

What is claimed is:
1. A pneumatic tire comprising:
    an annular structure that is cylindrical and metal where an outer side surface in a radial direction is a rough surface having an arithmetic mean roughness Ra of not less than 0.5 μm and less than 1.5 μm, the rough surface being formed by application of a roughening treatment to the outer side surface;
    a tread rubber layer forming a tread portion provided along a circumferential direction of the annular structure on an outer side of the annular structure; and
    a carcass portion including fibers covered with rubber provided on at least both sides, in a direction parallel to a center axis, of a cylindrical structure including the annular structure and the tread rubber layer.

2. The pneumatic tire according to claim 1, wherein the annular structure has an inner side surface in the radial direction that is a rough surface.

3. The pneumatic tire according to claim 1, wherein the roughening treatment is an acid treatment.

4. The pneumatic tire according to claim 1, wherein the annular structure has an inner side surface in the radial direction that is a rough surface and has an arithmetic mean roughness Ra of not less than 0.5 µm and not greater than 50 µm.

5. The pneumatic tire according to claim 1, wherein: a JIS (Japanese Industrial Standards) hardness of the tread rubber layer is not less than 46 and not greater than 88, where the JIS hardness is a type A durometer hardness measured at a temperature of 20° C. in accordance with JIS K6253; and the tread rubber layer contacts the annular structure.

6. The pneumatic tire according to claim 1, further comprising an adhesive rubber layer that bonds the tread rubber layer and the annular structure, wherein a JIS (Japanese Industrial Standards) hardness of the adhesive rubber layer is not less than 46 and not greater than 88, where the JIS hardness is a type A durometer hardness measured at a temperature of 20° C. in accordance with JIS K6253.

7. The pneumatic tire according to claim 1, wherein:
the annular structure is stainless steel, and
the roughening treatment also removes a passivation film on the stainless steel.

8. The pneumatic tire according to claim 7, wherein the annular structure is a precipitation hardening stainless steel.

9. The pneumatic tire according to claim 7, wherein the roughening treatment is an acid treatment.

10. The pneumatic tire according to claim 9, wherein the acid treatment is a treatment using a mixture of sulfuric acid and oxalic acid, and the rough surface formed by the acid treatment using a mixture of sulfuric acid and oxalic acid is further treated with a solution of a silane coupling agent and an acid so that the silane coupling agent is adhered to the rough surface.

11. The pneumatic tire according to claim 10, wherein the acid in the solution is acetic acid.

12. The pneumatic tire according to claim 10, wherein the silane coupling agent is bis(3-(triethoxysilyl)propyl) tetrasulfide.

13. The pneumatic tire according to claim 10, wherein a rubber layer directly contacts the rough surface with the silane coupling agent adhered thereto, the rubber layer directly contacting the rough surface with the silane coupling agent adhered thereto being either the tread rubber layer or an adhesive rubber layer that bonds the tread rubber layer and the annular structure, and a phenolic resin is blended with a compound that provides a methyl group in the rubber layer that directly contacts the rough surface with the silane coupling agent adhered thereto.

14. The pneumatic tire according to claim 1, wherein the material used for the metal of the annular structure has a tensile strength of not less than 800 N/m$^2$ and not more than 2,300 N/m$^2$.

15. The pneumatic tire according to claim 1, wherein a pressure resistance parameter, defined as a product of a tensile strength in MPa and a thickness in mm of the annular structure, and which is a parameter by which resistance against internal pressure of gas with which the pneumatic tire is filled is measured, is set to be not less than 250 and not greater than 1,600.

16. The pneumatic tire according to claim 1, further comprising an adhesive rubber layer that bonds the tread rubber layer and the annular structure, the adhesive rubber layer having a modulus at a time of 100% elongation of not less than 2.2 MPa and not more than 7 MPa.

17. The pneumatic tire according to claim 16, wherein:
the adhesive rubber layer has a JIS hardness of not less than 50 and not greater than 72, where the JIS hardness is a type A durometer hardness measured at a temperature of of 20° C. in accordance with JIS K6253;
the adhesive rubber layer has a thickness of not less than 0.01 mm and not more than 2 mm; and
the tread rubber layer has a thickness of not less than 5 mm and not more than 15 mm.

18. The pneumatic tire according to claim 1, wherein the annular structure comprises recesses and protrusions and is not exposed to the outer side in the radial direction of the tread rubber layer.

19. The pneumatic tire according to claim 1, wherein the annular structure comprises through-holes.

20. The pneumatic tire according to claim 19, wherein a cross sectional area of each of the through-holes is not less than 0.1 mm$^2$ and not more than 100 mm$^2$.

21. The pneumatic tire according to claim 19, wherein a sum of an area of the through-holes is not less than 0.5% and not more than 30% of a surface area of the outer side of the annular structure.

22. A method for manufacturing the pneumatic tire according to claim 1, wherein the method includes:
providing the annular structure;
arranging an unvulcanized rubber layer on the outer side in the radial direction of the annular structure to form the tread rubber layer;
attaching the carcass portion to the cylindrical structure including the annular structure and the tread rubber layer, thereby forming a green tire; and
vulcanizing the green tire to complete the tire, thereby vulcanizing the unvulcanized tread rubber layer and bonding the tread rubber layer and the annular structure.

* * * * *